US006473591B2

United States Patent
Kominato

(10) Patent No.: US 6,473,591 B2
(45) Date of Patent: Oct. 29, 2002

(54) IMAGE FORMING APPARATUS INCLUDING DISCHARGED-SHEET RECEIVING TRAY COVERED WITH FRAME

(75) Inventor: Ryusei Kominato, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/760,701

(22) Filed: Jan. 17, 2001

(65) Prior Publication Data

US 2001/0010770 A1 Aug. 2, 2001

(30) Foreign Application Priority Data

Jan. 27, 2000 (JP) ........................................ 2000-023281

(51) Int. Cl.[7] ............................................... G03G 15/00
(52) U.S. Cl. ........................................................ 399/405
(58) Field of Search ................................ 399/107, 110, 399/111, 113, 397, 405; 347/152

(56) References Cited

U.S. PATENT DOCUMENTS

| 5,021,837 A | * | 6/1991 | Uto et al. ................... 399/405 |
|---|---|---|---|
| 5,298,959 A | | 3/1994 | Saito et al. |
| 5,478,066 A | | 12/1995 | Yoshida et al. ................ 271/12 |
| 5,645,274 A | | 7/1997 | Ubayashi et al. .............. 271/94 |
| 5,722,652 A | | 3/1998 | Yoshida et al. ................ 271/11 |
| 5,839,032 A | * | 11/1998 | Yasui et al. ............. 399/110 X |
| 5,918,100 A | * | 6/1999 | Tanaka et al. .......... 399/110 X |
| 5,920,758 A | * | 7/1999 | Ohtsuki ...................... 399/405 |
| 6,263,185 B1 | * | 7/2001 | Kato et al. .............. 399/405 X |

* cited by examiner

*Primary Examiner*—Sandra Brase
(74) *Attorney, Agent, or Firm*—Fitzpatrick, Cella, Harper & Scinto

(57) ABSTRACT

An image forming apparatus has an image forming device for forming an image on a sheet, a discharged-sheet receiving device provided at an upper part of a casing including the image forming device, for receiving the sheet with an image formed thereon after being discharged, and a receiving frame for receiving the casing including the image forming device, the receiving frame being provided with a guide unit for guiding the sheet received in the discharged-sheet receiving device. The guide unit guides the sheet received in the discharged-sheet receiving device to be removed so that the sheet does not interfere with the receiving frame when the sheet is removed.

13 Claims, 9 Drawing Sheets

IMAGE FORMING APPARATUS INCLUDING DISCHARGED-SHEET RECEIVING TRAY COVERED WITH FRAME

BACKGROUND OF THE INVENTION

1. Field of the Invention

The present invention relates to image forming apparatuses. In particular, the present invention relates to an image forming apparatus provided with a digital image-reading device and an image forming device, preferably disposed vertically overlapping each other, in which a receiving tray to which sheets are discharged is provided between the image-reading device and the image forming device.

2. Description of the Related Art

Hitherto, an image forming apparatus is known which has a configuration in which, in order to reduce the size of the apparatus and the like, an image forming device and an image-reading device are disposed so as to be vertically separated from each other and sheets having images formed thereon are discharged through an opening between these devices.

The known image forming apparatus is described below with reference to FIGS. 6, 7, and 8. FIG. 6 is a perspective view of the known image forming apparatus. FIG. 7 is a sectional view of the image forming apparatus shown in FIG. 6. FIG. 8 is a perspective view of the image forming apparatus shown in FIG. 6, in which a printer as an image forming device is removed from a receiving rack.

As shown in FIGS. 6, 7, and 8, the known image forming apparatus includes a reader 1 as an image-reading device for optically reading image data from an original and converting the image data into a digital signal, a printer 2 for forming an image on a sheet in accordance with the image data read by the reader 1, and a receiving rack 3 for supporting and receiving the reader 1 and the printer 2.

The receiving rack 3 is described as follows. The receiving rack 3 includes a reader-mounting frame 4 and a printer-mounting base 5. The printer-mounting base 5 is provided with four casters 24.

The printer-mounting base 5 is movable back and forth in a direction Y shown in FIG. 8 independently from the receiving rack 3 (see FIG. 8).

In FIG. 8, the printer 2 is received in the receiving rack 3 in a manner such that the printer 2 is pushed into the receiving rack 2 until the printer-mounting base 5 comes into contact with a stopper 26 and is fixed to the receiving rack 3 by a fixing pin (not shown) at the printer-mounting base 5. The image forming apparatus is prevented from moving by adjusters 25.

The disposition of the reader 1, the printer 2, and the receiving rack 3 is described below. The reader 1 is mounted on the reader-mounting frame 4 and the printer 2 is mounted on the printer-mounting base 5 at predetermined positions, respectively, by being positioned by positioning members (not shown), respectively.

A part of an upper cover of the printer 2 forms a discharged-sheet receiving tray 6, sheets being discharged onto the discharged-sheet receiving tray 6. With the arrangement in which recorded sheets are discharged between the reader 1 and the printer 2, a discharging unit disposed protruding from a printer at a side thereof can be eliminated, whereby the footprint of the apparatus can be reduced.

A sheet feeder unit 7 is a front-loading-type sheet-feeder unit in which sheet cassettes are inserted from the front side of the apparatus. Therefore, the sheets can be charged from the front side of the apparatus. The printer 2 as an image forming device includes, mounted in a casing, an image forming unit, the sheet feeder unit 7, and the discharged-sheet receiving tray 6.

The printer 2 is removed from the receiving rack 3, as shown in FIG. 8, when maintenance service will be performed on the printer 2, or in the case of a jam and the like.

The space for removing the sheets from the discharged-sheet receiving tray 6, that is, the space between the reader-mounting frame 4 and the discharged-sheet receiving tray 6 is determined by the sizes of the reader 1 and the printer 2, the thickness of the reader 1, and the like.

The known image forming apparatus arranged as described above is reduced in size and is easy to handle.

However, a problem in removing discharged sheets has been found in the known image forming apparatus, the problem being described below with reference to FIG. 9. FIG. 9 is a conceptual view of the known image forming apparatus in which discharged sheets are being removed.

In FIG. 9, when the user holds the sheets with his or her hand H and moves their hand to the right as viewed in the drawing to remove the sheets from the discharged-sheet receiving tray 6, the sheets interfere at ends thereof with a side-face 3a of a frame member 3c of the receiving rack 3, whereby the sheets are damaged or are folded, or it is difficult to remove the sheets.

SUMMARY OF THE INVENTION

Accordingly, it is an object of the present invention to provide an image forming apparatus easy to handle, in which discharged sheets are removed easily.

To this end, according to an aspect of the present invention, an image forming apparatus comprises an image forming device for forming an image on a sheet; a discharged-sheet receiving device provided at an upper part of a casing including the image forming device, for receiving the sheet after being discharged by the image forming device with an image formed theiron; and a receiving frame for receiving the casing including the image forming device, the receiving frame being provided with a guide unit for guiding removal of the sheet received in the discharged-sheet receiving device.

The guide unit preferably guides the sheet received in the discharged-sheet receiving device so that the sheet does not interfere with the receiving frame when the sheet is removed.

The guide unit may be positioned in the receiving frame in a manner such that the guide unit includes a guide surface contactable with the sheet which is removed, so as to guide a leading end of the sheet to slide downwardly on the guide surface when the sheet is removed from the discharged-sheet receiving device.

The receiving frame may be provided with an image-forming-device mounting base which is movable away from the receiving frame, for mounting thereon the casing including the image forming device, the receiving frame having a frame member disposed above the casing including the image forming device and extending substantially in parallel to the direction of the movement of the image-forming-device mounting base.

The frame member of the receiving frame disposed above the casing including the image forming device supports an image-reading-device mounting base for mounting thereon an image reading device for reading an image.

The guide unit may be detachably mounted to the frame member of the receiving frame.

The guide unit may include a movable member with which the guide unit moves between a first position for guiding removal of the sheet from the discharged-sheet receiving device, and, in a waiting mode, a second position apart from the image forming device and above the first position when the casing including the image forming device moves away from the receiving frame.

The movable member may be a link structure provided on the image-reading-device mounting base, the link structure mating with the casing including the image forming device, thereby moving the guide unit.

The movable member may include a detector for detecting whether the casing including the image forming device is received in the receiving frame, and a driving unit for moving the guide unit in accordance with the detection by the detector.

The image reading device may have means to convert an image read from an original copy into a digital signal and supply the digital signal to the image forming device.

According to another aspect of the present invention, an image forming apparatus comprises a casing, an image forming member for forming an image on a sheet wherein the casing includes the image forming member; a sheet-receiving device provided at an upper face of the casing, for receiving the sheet on which an image has been formed; a receiving frame for receiving the casing, the receiving frame enclosing the casing at the upper face and a side face of the casing; a reading device mounted on upper frame members of the receiving frame, the upper frame members enclosing the upper face of the casing; and an inclined guide device provided downstream in the sheet-discharge direction of the sheet-receiving device, for guiding a sheet stack received in the sheet-receiving device so that the sheet stack does not interfere with the upper frame members.

According to the present invention, an image forming apparatus is provided in which recorded media after being discharged can be easily removed by being provided with a guide unit mounted to a receiving frame, for guiding the media toward under a frame member of the receiving frame disposed in the vicinity of the removal position.

Further objects, features and advantages of the present invention will become apparent from the following description of the preferred embodiments with reference to the attached drawings.

DESCRIPTION OF THE PREFERRED EMBODIMENTS

Figure 1:
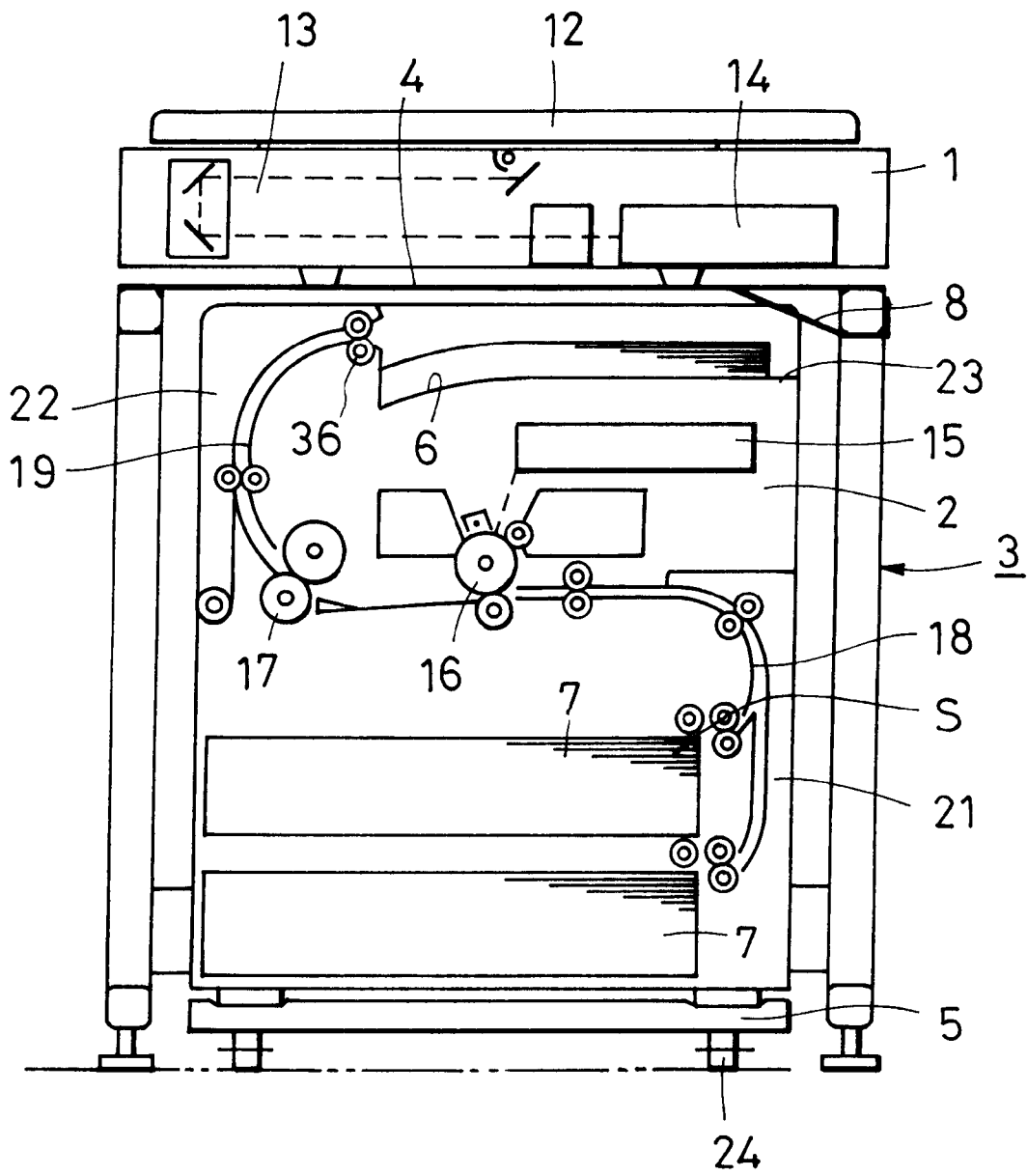
FIG. 1 is a sectional view of an image forming apparatus according to a first embodiment of the present invention.

Embodiments according to the present invention are described below with reference to the drawings. However, the present invention is not limited, unless otherwise described, to the following embodiments described for the sizes, the materials, and the shapes of components and the configuration thereof.

The same components as those described in the known technology and those described above are referred to with the same reference numerals.

First Embodiment

Figure 2:
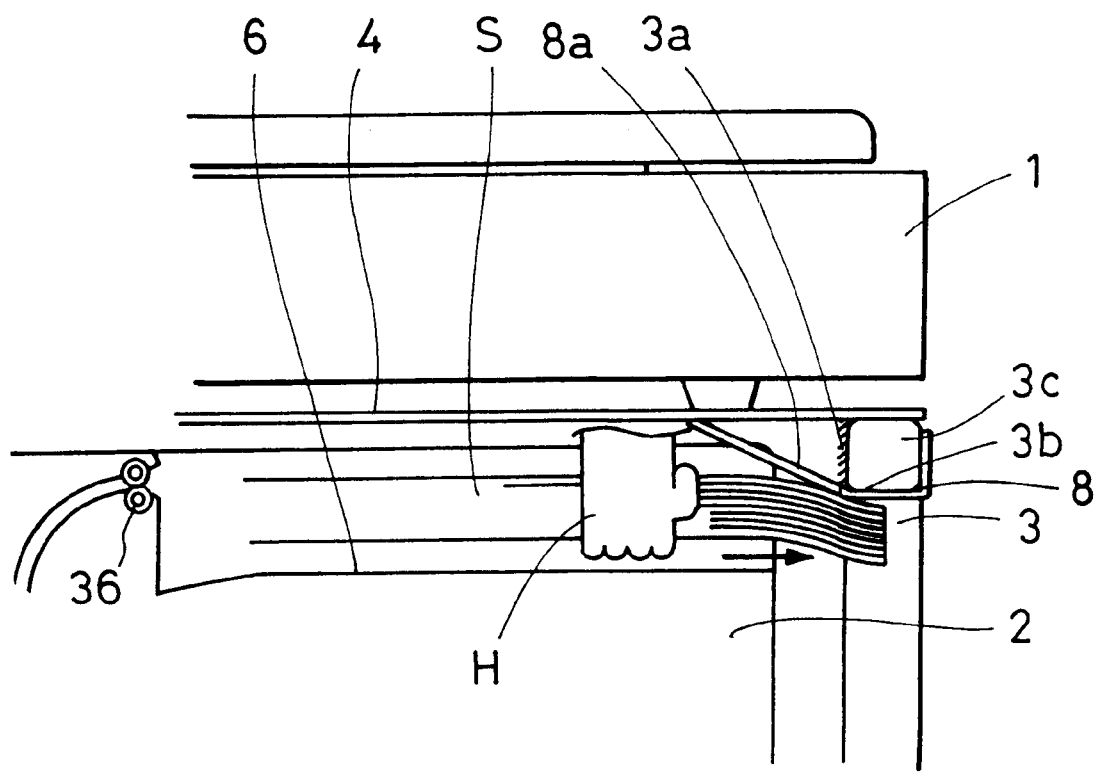
FIG. 2 is an exploded illustration of the image forming apparatus shown in FIG. 1 including a guide unit for sheets to be removed.

An image forming apparatus according to a first embodiment of the present invention is described below with reference to FIGS. 1 and 2. FIG. 1 is a sectional view of the image forming apparatus according to the first embodiment of the present invention. FIG. 2 is an enlarged illustration of a portion of the image forming apparatus shown in FIG. 1 including a guide unit for sheets to be removed.

In the same manner as in the known image forming apparatus, the image forming apparatus according to the present embodiment includes a reader 1 as an image-reading device for optically reading image data from an original and converting the image data into a digital signal, a printer 2 for forming an image on a sheet in accordance with the image data read by the reader 1, and a receiving rack 3 for supporting and receiving the reader 1 and the printer 2. These components are disposed in the same manner as in the known image forming apparatus, of which description is omitted.

In FIGS. 1 and 2, a guide surface 8a as a guide unit for removing sheets, according to the present invention, is formed integrally with the receiving rack 3. The guide surface 8a is disposed in a position so as not to interfere with a discharged-sheet receiving tray 6 as a discharged-sheet receiving member when discharged sheets S are stacked thereon.

The guide surface 8a is disposed higher than the leading edge in a discharging direction of an uppermost sheet of the sheets S when stacked to a maximum on the discharging tray 6, the stack of the sheets S including sheets of which the size in the removal direction, that is, the size in the transfer direction is also the maximum permissible size. This is to avoid problems during discharging and stacking the sheets S.

In FIG. 2, the guide surface 8a is brought into contact with the lower face of the reader-mounting frame 4 at an end of the guide surface 8a toward a sheet-discharging port 36 of the printer 2, and is formed so as to cover, at the other end of the guide surface 8a, a lower side 3b of a frame member 3c of the receiving rack 3 supporting the reader-mounting frame 4.

Figure 3:
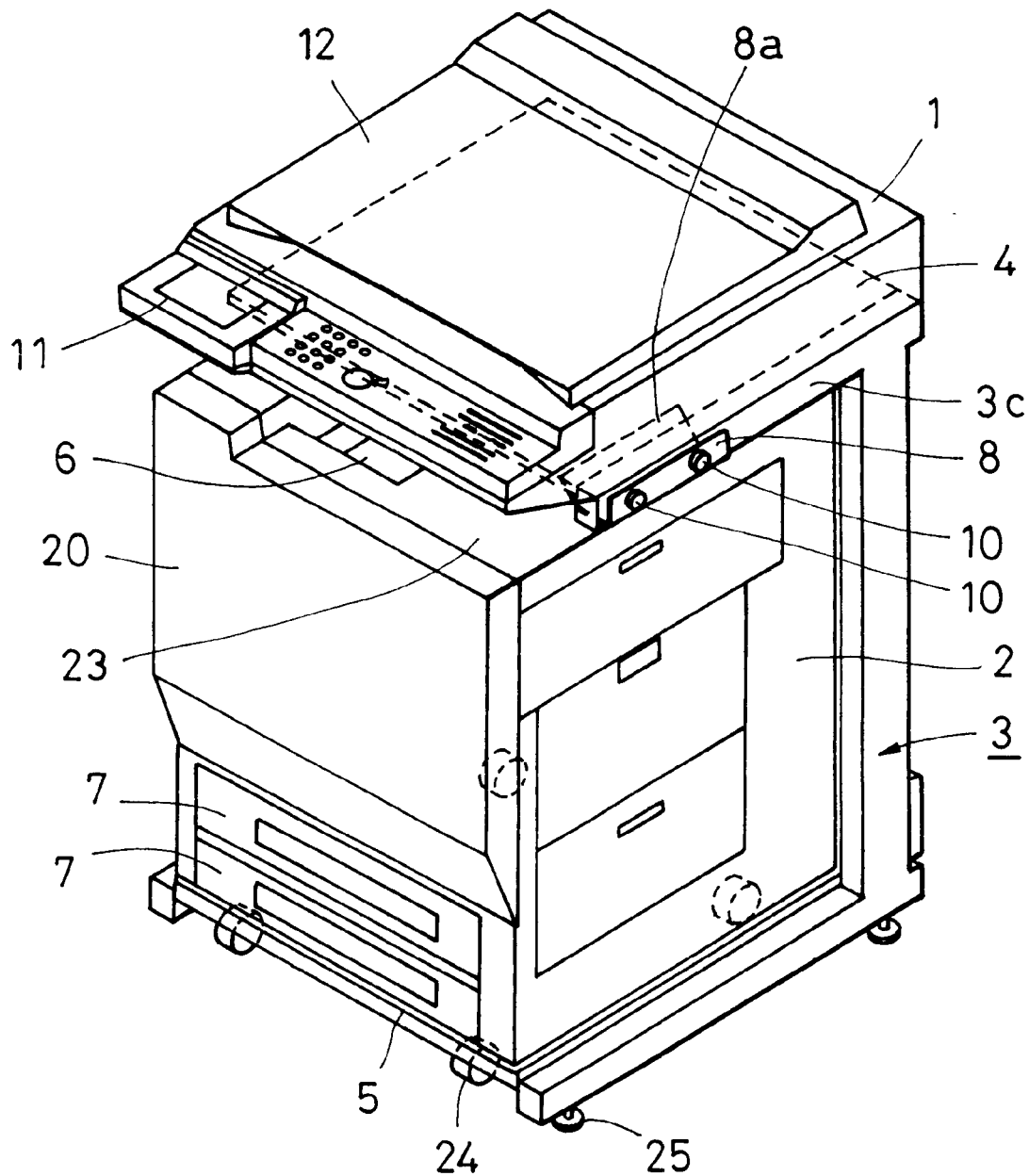
FIG. 3 is a perspective view of the image forming apparatus shown in FIG. 1.

The configuration of a guide unit 8 shown in FIGS. 1 and 2 is described below with reference to FIG. 3. FIG. 3 is a perspective view of the image forming apparatus shown in FIG. 1, In FIG. 3, a method for forming the guide surface 8a is shown. The guide unit 8 having the guide surface 8a is fixed to the frame member 3c of the receiving rack 3 at an outer side of the frame member 3c by screws 10.

The guide unit 8 can be removed from the frame member 3c of the receiving rack 3 by removing the screws 10, that is, the guide unit 8 is detachably fixed to the frame member 3c of the receiving rack 3.

The guide unit 8 is detachably affixed because there is a risk of the guide unit 8 interfering with an upper surface of the printer 2 at the guide surface 8a of the guide unit 8 when the printer 2 is removed from and is pushed into the receiving rack 3, when the upper surface of the printer 2 and the reader-mounting frame 4 are close to each other.

The structure and the operation of the reader 1 and printer 2 are described below with reference to FIGS. 1 to 3. The reader 1 includes a control panel 11 for operating the image forming apparatus, a platen cover 12 for pressing so as to hold an original copy placed on the reader 1, a scanning device 13 for scanning an image on the original copy, and a controller 14 for converting image data of the original copy into a digital signal. That is, the reader 1 operates the image forming apparatus, reads image data from an original copy, converts the image data into a digital signal, and supplies the digital signal to the printer 2.

The printer 2 includes a writing device (laser scanner) 15 for applying a laser beam to a photoreceptor and writing the image data thereon in accordance with the digital image data from the reader 1, an image forming device 16 for forming an electrostatic latent image then a toner image on the photoreceptor and transferring the toner image to a sheet, a photographic-fixing device 17 for fixing the toner image, and a sheet feeder unit 7 disposed in a lower part of the image forming apparatus.

An image-forming operation is described as follows. The user supplies a print-out-command to the printer 2 either by pressing a print-start button of the image forming apparatus or by using a personal computer, whereby a sheet S is transferred from the sheet feeder unit 7 to the image forming device 16 through a sheet-transfer path 18 formed at a side in the image forming apparatus. The toner image formed on the photoreceptor is transferred to the sheet S by the image forming device 16. The toner image formed on the sheet S is fixed by the photographic-fixing device 17. Then, the sheet S is discharged via a turn-around path 19 onto the discharged-sheet receiving tray 6 provided at the upper part of the printer 2.

In FIG. 2, when the discharged sheet S having an image formed thereon is removed from the image forming apparatus, the sheet S is held by a hand H and is moved in a direction of the arrow. In this case, the sheet S slides on the inclined guide-surface 8a at an end of the sheet S and passes under the frame member 3c of the receiving rack 3, whereby the sheet S is removed from the image forming apparatus, thereby avoiding damages to the sheet S and facilitating the removal operation.

Jam-processing and maintenance of the printer 2 are described below. As shown in FIG. 3, a front door 20 is provided at the front of the printer 2, through which the operation in the case of a jam and maintenance of the image forming device 16 and the sheet feeder unit 7 is performed.

The image forming apparatus is provided with a right door 21 and a left door 22 at sides of the image forming apparatus, through which jam-processing in the sheet-transfer path 18 and the turn-around path 19 is performed.

A removable upper cover 23 is provided at the upper part of the printer 2. The maintenance service for the writing device 15 and the like can be given by removing the upper cover 23.

Figure 8:
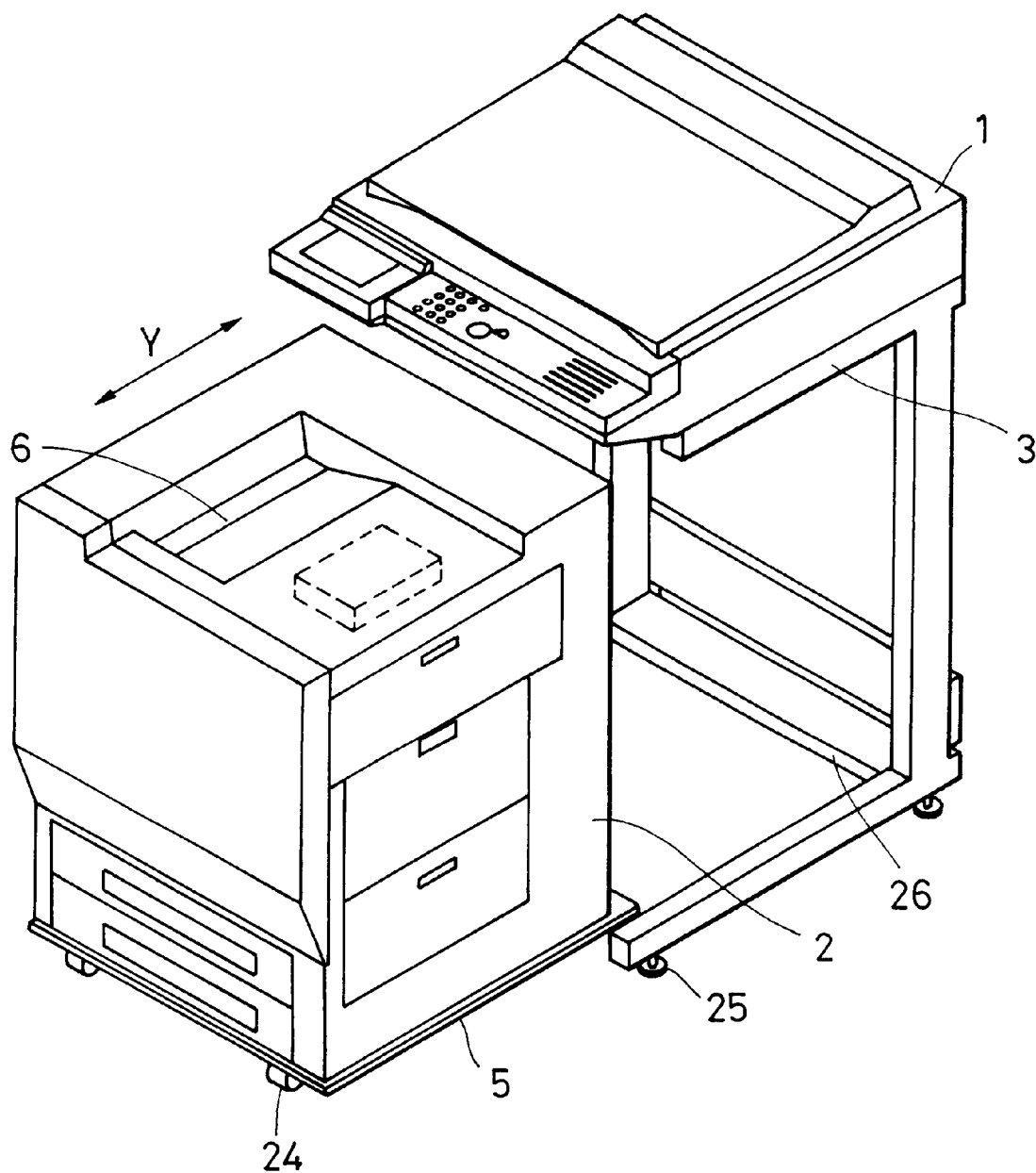
FIG. 8 is a perspective view of the known image forming apparatus shown in FIG. 6, in which a printer as an image forming device is removed from a receiving rack.
Figure 9:
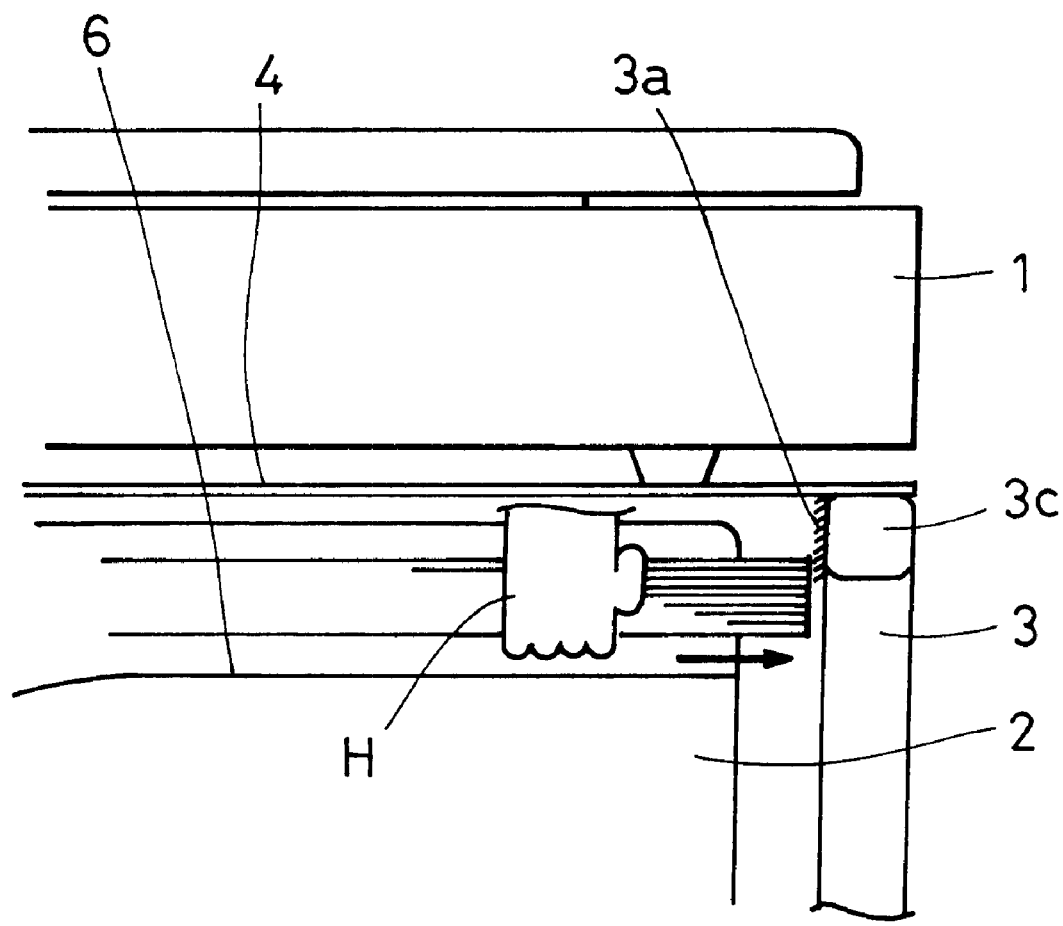
FIG. 9 is a conceptual illustration of the known image forming apparatus in which discharged sheets are being removed.

The maintenance operation is performed by removing the printer 2 outside as in the case of the known image forming apparatus described with reference to FIG. 8, when it is difficult to remove the upper cover 23 from the printer 2 received in the receiving rack 3.

The printer 2 may be removed after removing the guide unit 8, as needed.

According to the first embodiment of the present invention, the guide surface 8a guides a discharged sheet to be removed from the discharged-sheet receiving tray 6, whereby the sheet does not interfere with the frame member 3c of the receiving rack 3 and the like and the sheet can be removed easily.

In the image forming apparatus according to the first embodiment of the present invention, the guide unit 8 included in the receiving rack 3 guides the discharged sheet S to be removed from the discharged-sheet receiving tray 6, whereby the sheet S does not interfere with the frame member 3c of the receiving rack 3 and the like and the sheet S can be removed easily.

Since the reader 1 is disposed above the frame member 3c, the overall image forming apparatus can be reduced in size.

The image read from an original copy is sent to the printer 2 by the reader 1 in a digitized form, whereby the reader 1 and the printer 2 can be mechanically separated from each other, thereby providing wide freedom in designing the layout.

The sheet S is removed from the discharged-sheet receiving tray 6 substantially in the same direction as the direction of discharge of the sheet S to the discharged-sheet receiving tray 6, whereby the discharged sheet S can be removed easily.

The guide unit 8 is disposed higher than an edge in a discharge direction of an uppermost sheet of the sheets S discharged and stacked to a maximum on the discharging tray 6, the stack of the sheets S including sheets of which the size in the removal direction is greatest, whereby the sheet S does not interfere with the guide unit 8 and is not deformed by the guide unit 8 while being removed.

The guide unit 8 detachably mounted in the receiving rack 3 can be removed from the receiving rack 3 when the printer 2 is removed from the receiving rack 3, whereby the printer 2 can be removed easily.

Since the guide unit 8 is fixed to the frame member 3c, the guide unit 8 can be firmly affixed.

Second Embodiment

An image forming apparatus according to a second embodiment of the present invention is described below with reference to FIGS. 4A, 4B, 4C, 5A, and 5B.

Figure 4A:
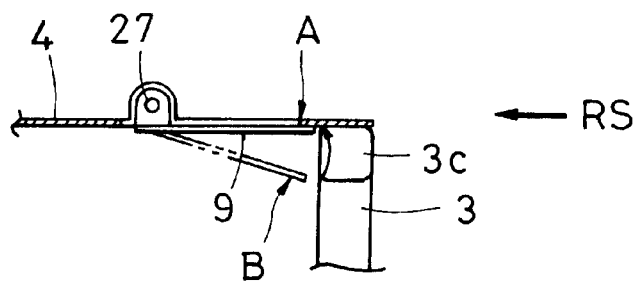
FIGS. 4A, 4B, and 4C are schematic views of a guide unit of a receiving rack of an image forming apparatus according to a second embodiment of the present invention.
Figure 4B:
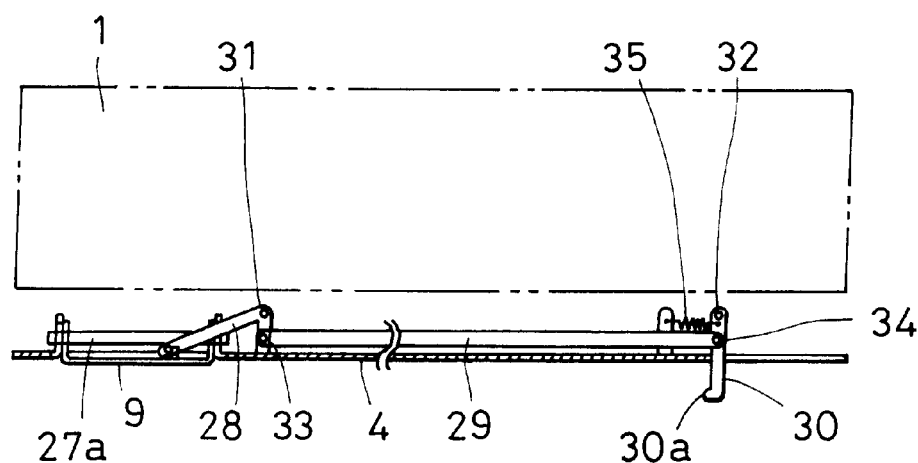
Figure 4C:
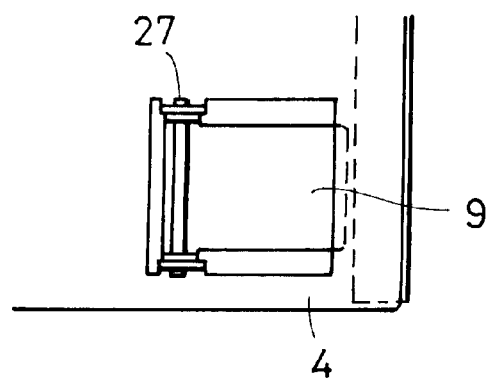
Figure 5A:
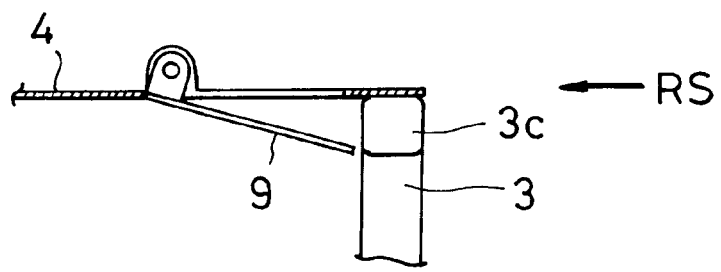
FIGS. 5A and 5B are schematic views of the guide unit of the receiving rack of the image forming apparatus according to the second embodiment of the present invention.
Figure 5B:
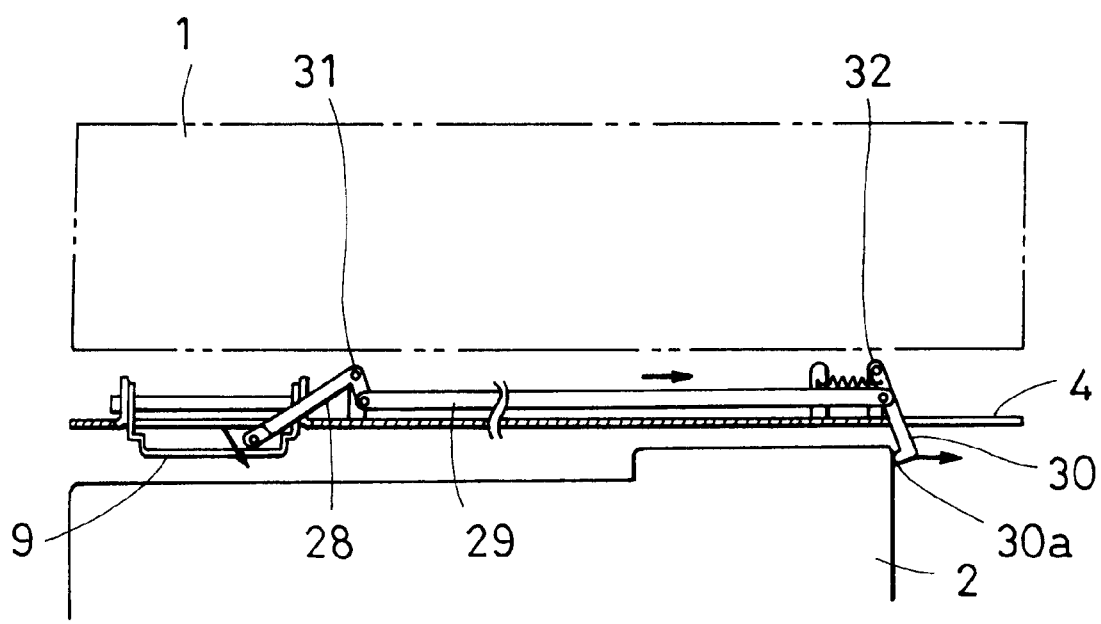
Figure 6:
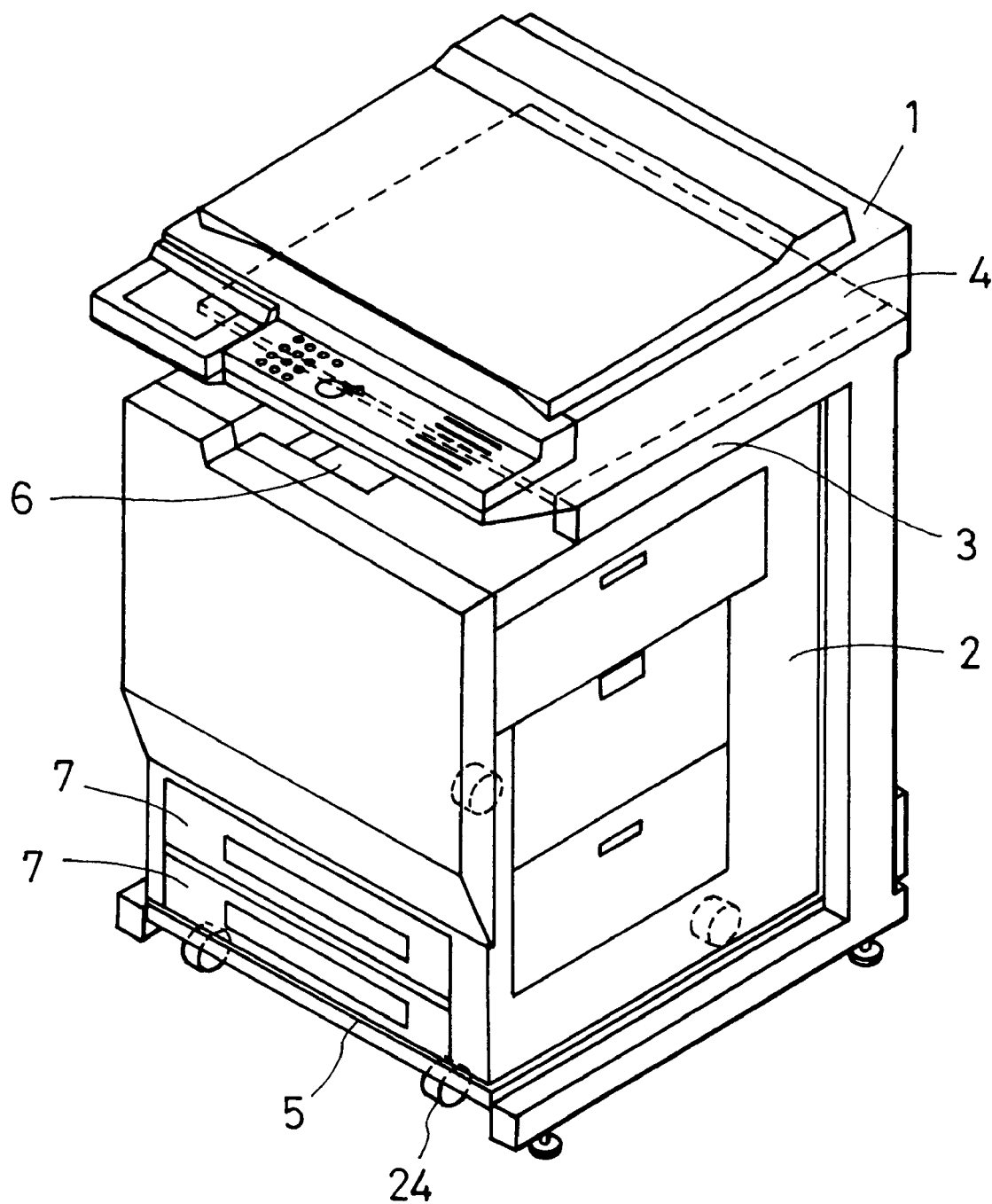
FIG. 6 is a perspective view of a known image forming apparatus.
Figure 7:
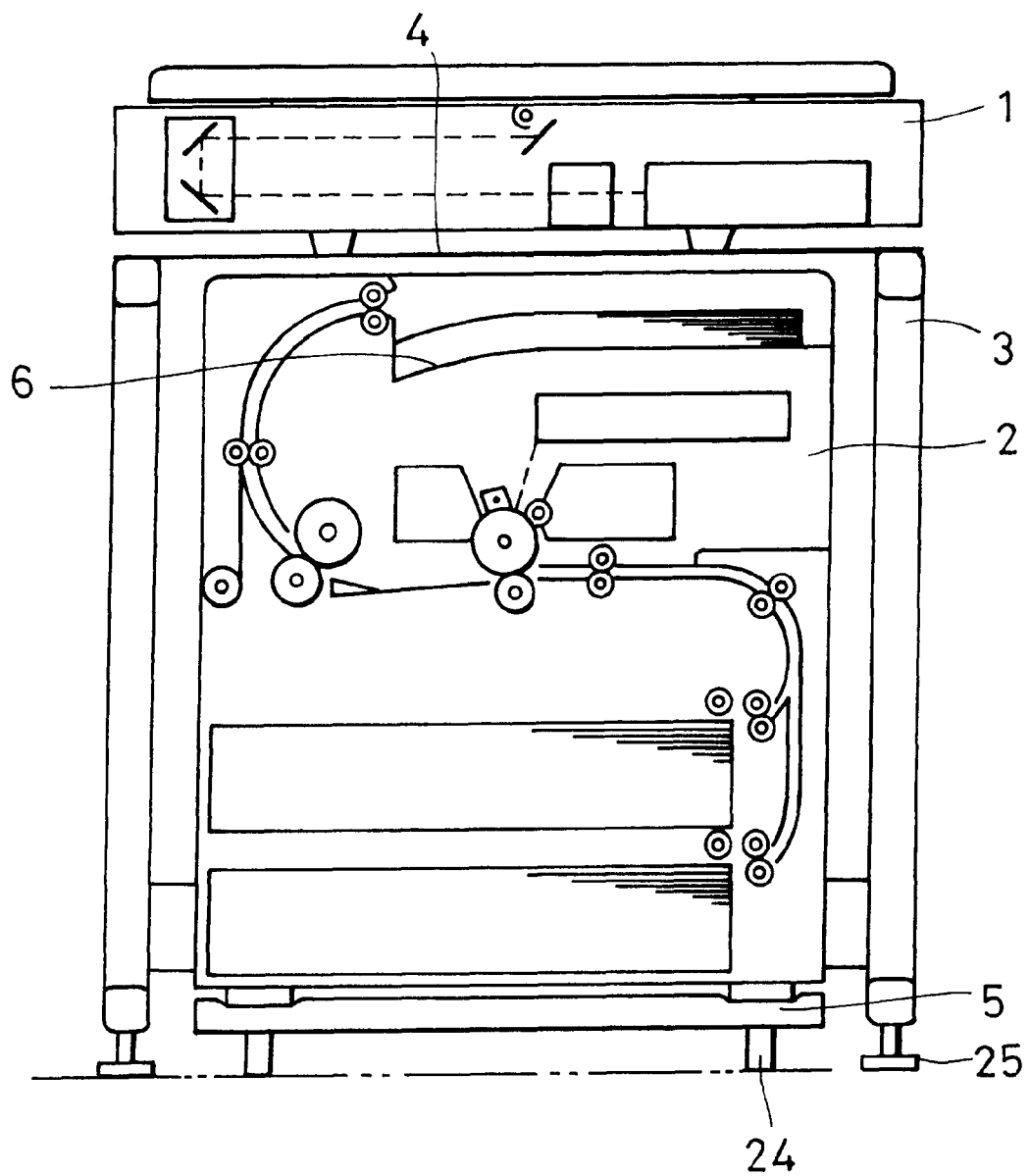
FIG. 7 is a sectional view of the known image forming apparatus shown in FIG. 6.

In FIGS. 4A to 5B, a receiving rack is shown, which is used in the image forming apparatus according to the second embodiment of the present invention. FIG. 4A is a front view, FIG. 4B is a right-side view in a direction RS, FIG. 4C is a plan view, FIG. 5A is a front view, and FIG. 5B is a right-side view in the direction RS, of the receiving rack, respectively.

A guide unit 9 for guiding according to the second embodiment is pivotably supported by a shaft 27 provided on a reader-mounting frame 4. According to the second embodiment, the guide unit 9 is positioned at a second position A shown in FIG. 4A when a printer 2 is removed for maintenance or the like from a receiving rack 3 for receiving the printer 2. The guide unit 9 is positioned at a first position B shown in FIG. 4A when the printer 2 is positioned at a predetermined position in the receiving rack 3 so as to be normally used.

The guide unit 9 moves to the position A and to the position B in conjunction with the movement of the printer 2. The structure and the operation of the guide unit 9 are described below.

FIGS. 4B and 5B show a structure in which the guide unit 9 vertically moves in accordance with the movement of the printer 2. In FIG. 4B, the guide unit 9 is positioned at the position A, and in FIG. 5B, the guide unit 9 is positioned at the position B.

The reader-mounting frame 4 is provided with links 27a, 28, 29 and 30 which are movable. The links 28 and 30 are supported pivotably on shafts 31 and 32, respectively, the shafts 31 and 32 being provided on the reader-mounting frame 4.

The link 28 is pivotably connected to the guide unit 9 at an end of the link 28 and to the link 29 via a shaft 33 at the other end of the link 28.

The link 29 is pivotably connected to the link 30 via a shaft 34 at an end opposite to the end of the link 29 connected to the link 28. The link 30 is disposed so that the printer 2 is brought into contact with the link 30 at an end 30a thereof when the printer 2 is received in the receiving rack 3.

In FIGS. 4B and 5B, the link 30 is urged clockwise by an extension spring 35 around the shaft 32. When the printer 2 is not received in the receiving rack 3, the guide unit 9 urged by the extension spring 35 via the links 27a, 28, and 29 is positioned in a waiting-mode at the position A, as shown in FIG. 4A.

When the printer 2 is received in the receiving rack 3, as shown in FIG. 5B, the link 30 is pressed toward the right at the end 30a thereof by the printer 2, thereby pressing the guide unit 9 to the position B shown in FIG. 4A via the links 27a, 28, and 29, as shown in FIG. 5A.

The image forming apparatus according to the second embodiment of the present invention offers the same advantage as that which is obtained from the image forming apparatus according to the above-described first embodiment of the present invention. Moreover, even when the reader-mounting frame 4 and an upper cover 23 of the printer 2 are disposed close to each other, it is not necessary to remove the guide unit 9 when the printer 2 is removed from the receiving rack 3, because the guide unit 9 withdraws in conjunction with the movement of the printer 2.

In the image forming apparatus according to the second embodiment of the present invention, an end of the guide unit 9 pivotably supported by the receiving rack 3, the end being disposed at the downstream side of the sheet S, is positioned above an upper surface of the printer 2 at the second position A when the printer 2 is not received in the receiving rack 3, whereby the printer 2 can be received in the receiving rack 3 without interference with the guide unit 9 when loading the printer 2 to the receiving rack 3.

By using the link 30 to come into contact with the printer 2, the guide unit 9 is shifted to the first position B for guiding the sheet S when the printer 2 is received in the receiving rack 3, and the guide unit 9 is shifted upwardly to the second position A apart from the printer 2 when the printer 2 is removed from the receiving rack 3. The guide unit 9 is positioned in accordance with the position of the printer 2, whereby the image forming apparatus can be used more easily.

Although according to the second embodiment, the guide unit 9 is operated by a part of a link system coming into contact therewith, the guide unit 9 may be operated by using a detector for detecting the printer 2 received in the receiving rack 3 and the link system electrically driven by a driving member such as an electric solenoid.

According to the embodiments of the present invention, the discharged sheets are removed from the image forming apparatus substantially in the same direction as that in which the sheets are discharged. However, the direction in which the sheets are removed from the image forming apparatus according to the present invention is not limited to these embodiments, and the discharged sheets may be removed from the image forming apparatus in a direction differing from that in which the sheets are discharged, for example, in a direction perpendicular to the discharge direction.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims.

What is claimed is:

1. An image forming apparatus comprising:
    image forming means for forming an image on a sheet;
    a casing containing said image forming means;
    a discharged-sheet receiving device provided at an upper part of the casing, for receiving the sheet after being discharged by the image forming means with an image formed thereon; and
    a receiving frame for receiving the casing including the image forming means, the receiving frame being provided with guide means for guiding removal of the sheet received in the discharged-sheet receiving device,
    wherein the guide means is positioned in the receiving frame in a manner such that the guide means includes a guide surface contactable with the sheet which is removed, so as to guide a leading end of the sheet to slide downwardly on the guide surface when the sheet is removed from the discharged-sheet receiving device.

2. An image forming apparatus according to claim 1, wherein the receiving frame is provided with an image-forming-device mounting base for mounting thereon the casing, wherein the image-forming-device mounting base is movable away from the receiving frame, the receiving frame having a frame member disposed above the casing and extending substantially in parallel to the direction of the movement of the image-forming-device mounting base.

3. An image forming apparatus according to claim 2, wherein the frame member of the receiving frame disposed above the casing including the image forming device supports an image-reading-device mounting base for mounting thereon an image reading device for reading an image.

4. An image forming apparatus according to claim 3, wherein the image reading device includes means for converting an image read from an original copy into a digital signal and for supplying the digital signal to the image forming device.

5. An image forming apparatus according to claim 2, wherein the guide means is detachably mounted to the frame member of the receiving frame.

6. An image forming apparatus according to claim 1, wherein the guide means includes a movable member with which the guide means moves between a first position for guiding removal of the sheet from the discharged-sheet receiving device, and, in a waiting mode, a second position apart from the image forming device and above the first position when the casing including the image forming device moves away from the receiving frame.

7. An image forming apparatus according to claim 6, wherein the movable member is a link structure provided on the image-reading-device mounting base, the link structure mating with the casing including the image forming device, thereby moving the guide means.

8. An image forming apparatus according to claim 6, wherein the movable member includes a detection for detecting whether the casing including the image forming device is received in the receiving frame, and a driving unit for moving the guide means in accordance with the detection.

9. An image forming apparatus comprising:

a casing;

image forming means for forming an image on a sheet, said casing containing the image forming means;

sheet-receiving means, provided at an upper face of said casing, for receiving the sheet on which an image is formed by the image forming means;

a receiving frame for receiving the casing, the receiving frame enclosing the casing at the upper face and a side face of the casing;

a reading device mounted on upper frame members of the receiving frame, the upper frame members enclosing the upper face of the casing; and inclined guide means provided downstream in a sheet-discharge direction of said sheet-receiving means, for guiding a sheet stack received in the sheet-receiving means so that the sheet stack does not interfere with the upper frame members.

10. An image forming apparatus according to claim 9, wherein said inclined guide means is mounted to the upper frame members so that the inclined guide means guides the sheet stack toward a space formed under the upper frame members.

11. An image forming apparatus according to claim 10, wherein said inclined guide means is detachably mounted to the upper frame members.

12. An image forming apparatus according to claim 9, wherein said inclined guide means is supported for movement between an inclination-acting position and a waiting position in accordance with the movement of the casing into the receiving frame and away from the receiving frame.

13. An image forming apparatus according to claim 12, wherein said inclined guide means guides the sheet stack toward a space formed under the upper frame members when said inclined guide means is positioned at the inclination-acting position.

* * * * *

UNITED STATES PATENT AND TRADEMARK OFFICE
CERTIFICATE OF CORRECTION

PATENT NO.    : 6,473,591 B2
DATED         : October 29, 2002
INVENTOR(S)   : Ryusei Kominato It is certified that error appears in the above-identified patent and that said Letters Patent is hereby corrected as shown below:

<u>Column 2,</u>
Line 38, "theiron" should read -- thereon --.

Signed and Sealed this

Twenty-fifth Day of March, 2003

JAMES E. ROGAN
*Director of the United States Patent and Trademark Office*